United States Patent [19]

Demmer

[11] 4,362,853
[45] Dec. 7, 1982

[54] RESINOUS SALTS, THEIR PREPARATION, AND THEIR USE IN COATINGS

[75] Inventor: Christopher G. Demmer, Cambridge, England

[73] Assignee: Ciba-Geigy Corporation, Ardsley, N.Y.

[21] Appl. No.: 310,710

[22] Filed: Oct. 13, 1981

[30] Foreign Application Priority Data

Oct. 24, 1980 [GB] United Kingdom ................ 8034886
Jun. 18, 1981 [GB] United Kingdom ................ 8118830

[51] Int. Cl.$^3$ ........................ C08G 8/20; C08G 8/32; C08G 14/06; C08G 59/14
[52] U.S. Cl. ................................ 525/533; 428/460; 524/596; 528/137; 528/139; 528/142; 528/144; 528/145; 528/146; 528/147; 528/153; 528/155
[58] Field of Search ............... 528/155, 153, 137, 139, 528/142, 144, 145, 146, 147; 525/533

[56] References Cited

U.S. PATENT DOCUMENTS

| | | |
|---|---|---|
| 2,717,263 | 9/1955 | McKinney et al. |
| 3,563,926 | 2/1971 | Lackner |
| 3,936,399 | 2/1976 | Hirai et al. |
| 3,975,346 | 8/1976 | Bosso et al. |
| 3,994,989 | 11/1976 | Kempter et al. |
| 4,000,116 | 12/1976 | Renner |
| 4,014,955 | 3/1977 | Renner |
| 4,098,744 | 7/1978 | Allen et al. |
| 4,189,450 | 2/1980 | Kempter et al. |
| 4,299,747 | 11/1981 | Birkmeyer ............... 525/533 X |

FOREIGN PATENT DOCUMENTS

| | | |
|---|---|---|
| 1254528 | 11/1971 | United Kingdom |
| 1428835 | 3/1976 | United Kingdom |
| 1457932 | 12/1976 | United Kingdom |
| 1563917 | 4/1980 | United Kingdom |
| 1586911 | 3/1981 | United Kingdom |

OTHER PUBLICATIONS

CA, 50, 7138h, (1956), (=AG).
CA, 70, 69340y, (1969), (=AI).

Primary Examiner—Howard E. Schain
Attorney, Agent, or Firm—Luther A. R. Hall

[57] ABSTRACT

Carboxylate salts, prepared by a Mannich reaction and useful in the preparation of water-borne coatings, have the general formula

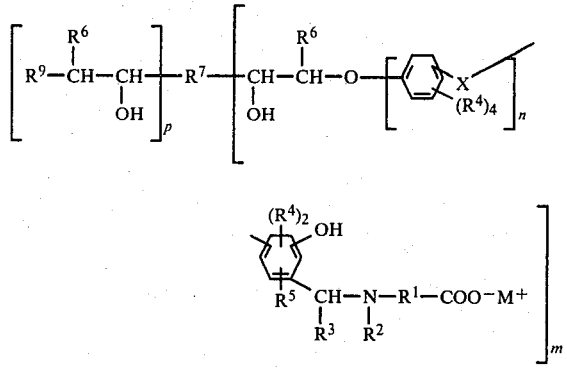

where
R$^1$ represents an aliphatic, aromatic, or araliphatic divalent group which may contain a further —COO$^-$M$^+$; R$^2$ represents —H, —CH(R$^3$)N(R$^{10}$)R$^1$COO$^-$M$^+$, or alkyl which may be substituted by —COO$^-$M$^+$, —CH(R$^3$)OH, or —CH(R$^3$)OR$^8$, R$^1$ and R$^2$ containing together not more than one —COO$^-$M$^+$; R$^3$ represents —H or alkyl; each R$^4$ represents —H, halogen, alkyl, or alkenyl; R$^5$ represents —H, halogen, alkyl, alkenyl, or a group —CH(R$^3$)OH, —CH(R$^3$)OR$^8$, or —CHR$^3$—NR$^2$—R$^1$—COO$^-$M$^+$; either R$^6$ represents —H and R$^7$ represents the residue of a polyepoxide, preferably of average mol. wt. 1000–5000, or R$^6$ represents a covalent bond linked to the group R$^7$, and R$^7$, together with the indicated hydroxyethylene group, forms a cycloaliphatic ring; R$^8$ represents alkyl or alkoxyalkyl; R$^9$ denotes the residue of an optional terminating group; R$^{10}$ denotes —H, —COO$^-$M$^+$, or an alkyl group which may be substituted by —COO$^-$M$^+$, —CH(R$^3$)OH, or —OCH(R$^3$)OR$^8$; m represents 1, 2, 3, or 4; n and p represent zero or 1, X represents alkylene, carbonyl, sulfonyl, oxygen, sulfur, or a valence bond; and M$^+$ represents a hydrogen ion or a monovalent cation derived from an alkali metal, ammonia, or an amine, at least 25% of the ions being a said monovalent cation.

Compositions comprising these salts and, if required, a phenoplast, an aminoplast, or blocked polyisocyanate, are stable when dispersed in water, usually with the aid of a minor amount of an organic solvent, and may be used to form protective films, especially for metal containers.

13 Claims, No Drawings

RESINOUS SALTS, THEIR PREPARATION, AND THEIR USE IN COATINGS

BACKGROUND OF THE INVENTION

This invention relates to new, water-soluble or water-dispersible resinous carboxylic acid salts, to aqueous compositions containing them, and to surfaces coated with such compositions.

To obtain a corrosion-resistant coating for metal containers which contact foodstuffs, beverages, or corrosive materials, it is conventional practice to coat the metal surface with a crosslinkable resin formulation dissolved in an organic solvent, then to heat the coating to evaporate the solvent and cross-link the resin. Crosslinking of the coating converts it into a tough, adherent, flexible, and protective film. During heating, the solvent is usually evaporated into the atmosphere. Since organic solvents are relatively expensive, inflammable, and usually environmentally objectionable, there exists a need for coatings which may be applied using minimal proportions of such solvents, particularly useful being coating compositions containing a high proportion of water. A further important requirement of such coatings is that they are themselves non-toxic and that they do not give rise to the leaching of toxic or flavour-tainting material into the foodstuff or beverage with which they may be in contact for prolonged periods. This latter requirement has in the past restricted the use of some aqueous systems.

We have now found that stable, aqueous, coating compositions which cure to give coatings having excellent mechanical properties and chemical resistance, and which in general do not give rise to the leaching of toxic or flavour-tainting material into foodstuffs or beverages, may be prepared from new resinous carboxylic salts. These salts are prepared from a phenol-terminated resin by a Mannich reaction with an aminoacid and an aldehyde, with partial or complete neutralisation of the carboxylic acid group or groups introduced by the aminoacid. They may be used with an aminoplast, a phenol-formaldehyde resin, or a blocked polyisocyanate as aqueous surface coating compositions. In certain circumstances, the addition of such a coreactant is not, however, necessary.

The use of a Mannich reaction to obtain water-soluble coating compositions has already been disclosed.

For example, in U.S. Pat. Nos. 4,188,312 and 4,189,450 there are described coating compositions containing the reaction product of an epoxide resin (i.e., a compound having, per average molecule, more than one 1,2-epoxide group) and a Mannich base and, in the first of these Patents, an unsaturated alkylphenol. This Mannich base is the reaction product of a polyhydric polynuclear phenol, a secondary amine containing at least one hydroxyalkyl group, such as an N-alkylethanolamine or an N-alkylisopropanolamine, formaldehyde and, in the second of these Patents, a butadiene or isoprene homo- or co-polymer containing phenolic groups.

British Patent Specification No. 1,428,835 describes a cationic polymer prepared by the aminomethylation of a p-hydroxystyrene polymer, using formaldehyde and a secondary amine which has alkyl, alkenyl, or aromatic groups attached to the nitrogen atom, or a secondary amine which is a heterocycle having 4 to 6 carbon atoms in the ring. The product may be quaternised or an acid addition salt may be formed from it.

U.S. Pat. Nos. 4,000,116 and 4,014,955 describe cross-linked macromolecular polyethers prepared by reaction of a Mannich base with a polyepoxide, followed by polyquaternisation, or by reaction with a compound containing both a chlorine, bromine, or iodine atom bonded to a hydrocarbon radical and at least one epoxide group. The Mannich bases are prepared from a monomeric bisphenol and the amines used are dialkylamines or morpholine.

British Patent Specification No. 1,457,932 describes epoxide group-free polymers which are water-soluble in their protonated form and are suitable for use in coatings. They are prepared by reaction of a Mannich base with an epoxide resin, followed by salt formation. The Mannich base, containing one or more cationic hydroxyalkylaminomethyl groups attached to each aromatic ring, is prepared by reaction of a bisphenol, a hydroxyl group-containing secondary amine, or a mixture of such an amine with another primary or secondary amine, and formaldehyde. The resin therefore contains these cationic groups attached to each ring in as many residues derived from the Mannich base as are in the molecular chain.

In the processes described in other patent specifications of this type, polymeric bisphenols which are reaction products of monomeric bisphenols and epoxide resins are reacted with formaldehyde and a hydroxyalkyl group-containing secondary amine to produce polymeric Mannich base bisphenols. For example, in the process described in U.S. Pat. No. 3,994,989 such a polymeric bisphenol is reacted in admixture with a monomeric bisphenol; in the process described in British Patent Specification No. 1,563,917 the polymeric bisphenol is reacted alone or in admixture with a monomeric bisphenol. The polymeric Mannich base bisphenols have cationic hydroxyalkylaminomethyl groups attached to only one aromatic ring at each end of the chain. However, these polymeric Mannich base bisphenols are not used directly in coating compositions, but are further advanced by reaction with epoxide resins to produce bisphenols of yet higher molecular weight. In the latter, the cationic groups would be attached to the terminal aromatic rings of the residues derived from the polymeric Mannich base bisphenols not only at the ends of the molecular chain of the final product but also wherever those residues occur in the remainder of the chain.

In none of the above specifications is there suggested the use of a Mannich base prepared from an aminoacid, yielding a water-soluble or water-dispersible product bearing anionic groups.

In British Patent Specification No. 1,327,071 there are described aqueous cationic electrodepositable compositions comprising the reaction product of a polyepoxide and an amine, which term is used to include aminoacids. There is no suggestion made in the Specification that the amine could be made to undergo a Mannich reaction in order to solubilise the polyepoxide.

Phenol group-containing resins having carboxy-substituted alkylaminomethyl groups, said to be useful as dispersing agents for proteins and as ingredients in adhesives, are described in U.S. Pat. No. 2,717,263. These dispersing agents are prepared by condensation of an A-stage phenolic resin with an aminoacid and formaldehyde. There is no indication whether these products would be suitable for use as coating resins, nor whether the phenolic resin could be replaced by the reaction product of a phenol with a polyepoxide.

In U.S. Pat. No. 3,936,399 phenolic chelating resins are described which are prepared by a Mannich reaction of a phenol, iminodiacetic acid, and an aldehyde, and polycondensing the resultant product with an aldehyde. The polycondensed resin has highly selective adsorbability to heavy metals. There is no indication that the intermediate material, prepared by the Mannich reaction, would have any other utility.

Finally, in U.S. Pat. No. 3,563,926, a process is described in which a resinous epoxide is condensed with a phenol or an amine, and the product is reacted with an aldehyde to give a 'precondensate'. The precondensate is then reacted with a polycarboxylic acid and rendered water-soluble by the addition of a nitrogen base. As well as the use of phenols and amines, the patent also describes the use of condensates of an aldehyde with a phenol or an amine. It does not, however, describe the use of a precondensate prepared from a resinous epoxide, a phenol, an amine, and an aldehyde, and so there is no possibility of a Mannich reaction taking place.

SUMMARY OF THE INVENTION

This invention provides new water-soluble or water-dispersible carboxylate salts of the general formula

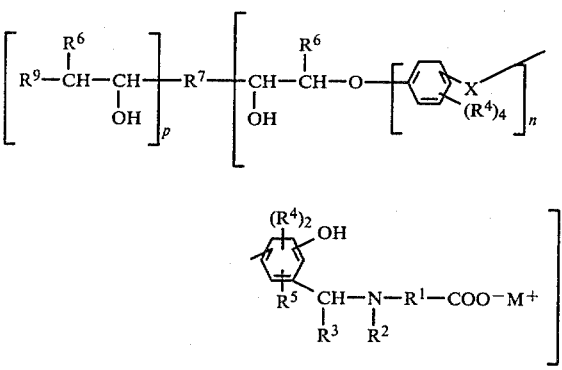

I where $R^1$ represents an aliphatic, aromatic, or araliphatic divalent group of 1 to 10 carbon atoms which may contain a further group $-COO^-M^+$ and is preferably an alkylene group of 1 to 4 carbon atoms or a phenylene group, $R^2$ represents a hydrogen atom, a group of formula

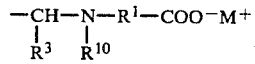

II or an alkyl group of from 1 to 6 carbon atoms which may be substituted by a further group $-COO^-M^+$ or by a group of formula $-CH(R^3)OH$ or $-CH(R^3)OR^8$, with the proviso that $R^1$ and $R^2$ contain together not more than one group of formula $-COO^-M^+$, $R^3$ represents a hydrogen atom, an alkyl group of 1 to 4 carbon atoms, or an aryl group of 6 to 10 carbon atoms, each $R^4$, which may be the same or different, represents a hydrogen atom, a halogen atom (such as a chlorine or a bromine atom), an alkyl group of 1 to 4 carbon atoms, or an alkenyl group of 2 to 4 carbon atoms, $R^5$ represents an atom or a group bonded to a ring carbon atom which is ortho or para to the indicated phenolic hydroxyl group and is a hydrogen atom, a halogen atom (such as a chlorine or a bromine atom), an alkyl group of 1 to 4 carbon atoms or an alkenyl group of 2 to 4 carbon atoms, a group of formula $-CH(R^3)OH$, a group of formula $-CH(R^3)OR^8$, or a group of formula II, either $R^6$ represents a hydrogen atom, in which case $R^7$ represents the residue, preferably having an average molecular weight of from 1000 to 5000, of a polyepoxide after removal of (m+p) 1,2-epoxide groups, or $R^6$ represents a covalent bond linked to the group $R^7$, in which case $R^7$, together with the indicated hydroxyethylene group, forms a cycloaliphatic ring which may be substituted by aliphatic, cycloaliphatic and/or heterocyclic groups, $R^8$ represents an alkyl group of from 1 to 6 carbon atoms or an alkoxyalkyl group wherein the alkoxy group and the alkyl group each have from 1 to 6 carbon atoms, $R^9$ represents the residue of a monohydric phenol, a secondary monoamine, or a monocarboxylic acid after removal of the hydrogen atom of the phenolic hydroxyl group, the carboxylic acid group, or the secondary amino group, m represents 1, 2, 3, or 4, n represents zero or 1, p represents zero or 1, such that (m+p) is at least 2 and at most 4 and is preferably 2, X represents an alkylene or alkylidene group of 1 to 3 carbon atoms, a carbonyl or sulphonyl group, an oxygen or sulphur atom, or a valency bond, $M^+$ represents a hydrogen ion or a monovalent cation derived from an alkali metal, ammonia, or an amine, including quaternary ammonium cations, with the proviso that at least 25% of the ions $M^+$ are a said monovalent cation, the indicated phenolic hydroxyl group being ortho or para to the indicated group

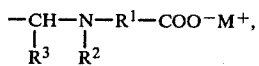

wherein $R^{10}$ denotes a hydrogen atom, a group $-COO^-M^+$, or an alkyl group of 1 to 6 carbon atoms which may be substituted by a further group $-COO^-M^+$ or by a group of formula $-CH(R^3)OH$ or $-CH(R^3)OR^8$.

DESCRIPTION OF THE PREFERRED EMBODIMENTS

Preferably the salts of formula I are further of the formula

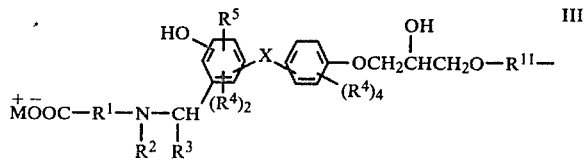

III

-continued

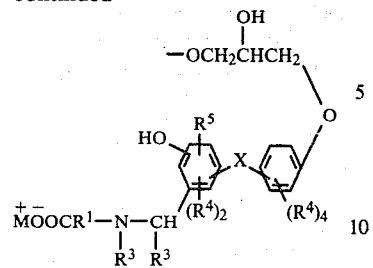

or

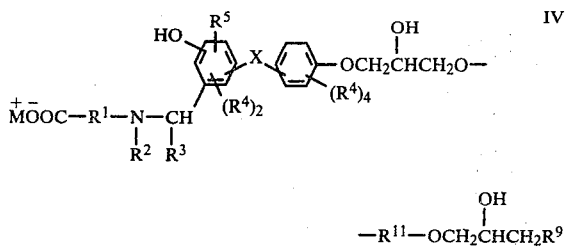

where
R$^1$, R$^2$, R$^3$, R$^4$, R$^5$, R$^9$, X, and M$^+$ are as hereinbefore defined, and
R$^{11}$ represents the residue of an aliphatic, cycloaliphatic, or aromatic diglycidyl ether or ester after removal of both glycidyl groups.

It is further preferred that R$^{11}$ in the compounds of formula III or formula IV is itself of formula

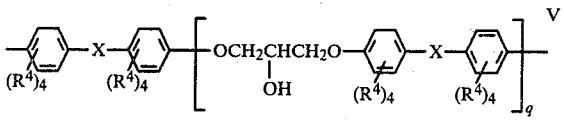

where
R$^4$ and X are as hereinbefore defined and
q is zero or an integer of from 1 to 20, and preferably from 2 to 10.

Salts of formula I, III, and IV wherein the indicated phenolic hydroxyl groups are in a position para to the group X are particularly preferred, as are those in which R$^3$ and R$^4$ both represent hydrogen atoms.

The new carboxylate salts of formula I may be prepared from the corresponding phenol-terminated resins of formula

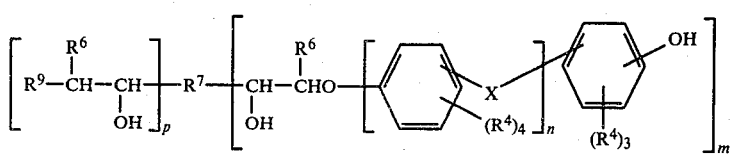

wherein
R$^4$, R$^6$, R$^7$, X, m, n, and p are as hereinbefore defined, with the proviso that at least one of the two carbon atoms ortho, or the one carbon atom para, to the carbon atom bearing the indicated phenolic hydroxyl group is unsubstituted, by a Mannich reaction in the presence of a source of M$^+$ (where M$^+$ is as previously defined) ions with an aldehyde of formula R$^3$CHO 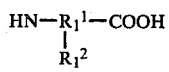

where R$^3$ is as hereinbefore defined, and an aminoacid of formula $$HN-R_1^1-COOH \qquad VIII$$
$$\phantom{HN-}R_1^2$$

where R$_1^1$ and R$_1^2$ are as hereinbefore defined for R$^1$ and R$^2$ respectively but may contain a carboxylic acid (—COOH) substituent instead of a —COO$^-$M$^+$ substituent.

This reaction is preferably effected by heating the reactants, usually in an inert solvent, in the presence of sufficient base at least partially to neutralise the aminoacid. The reaction temperature is usually within the range 60° to 180° C., especially 75° to 130° C., and the reaction is usually complete within 15 minutes to 4 hours. Suitable inert solvents for the reaction include hydrocarbons, ethers, alcohols, and esters; amongst these toluene, xylene, tetrahydrofuran, butanols, ethyl acetate, and especially 2-butoxyethanol and 2-ethoxyethanol, are preferred. Suitable bases for the at least partial neutralisation include sodium hydroxide, sodium carbonate, potassium hydroxide, potassium carbonate, ammonia, triethylamine, and triethanolamine; 2-(dimethylamino)-2-methylpropan-1-ol and 2-(dimethylamino)ethanol are particularly preferred.

Usually 0.3 to 2.0 moles of the aminoacid of formula VIII are used per mole of phenolic hydroxyl groups in the resin of formula VI. An excess of the aldehyde of formula VII is usually employed, especially 1.1 to 4.0 moles of the aldehyde per mole of the aminoacid of formula VIII, since the products exhibit greater stability to storage at room temperature if an excess of an aldehyde is used.

Preferred aldehydes of formula VII are those wherein R$^3$ represents an alkyl group or a hydrogen atom; formaldehyde (conveniently formed in situ from paraformaldehyde) is particularly preferred. Suitable aminoacids of formula VIII which may be used include sarcosine, iminodiacetic acid, anthranilic acid, and especially glycine, glutamic acid, aspartic acid, and p-aminobenzoic acid.

The phenol-terminated resins of formula VI used as starting materials are themselves prepared by the reaction of a polyepoxide, preferably a diepoxide, with an excess of a dihydric phenol using known methods. This reaction results in advancement of the polyepoxide through reaction with both hydroxyl groups of the dihydric phenol. There must be as much dihydric phenol present as there is polyepoxide, on a molar basis, in order to give a product having at least one terminal phenolic group. The molar ratio of polyepoxide to dihydric phenol is usually within the range 1:1.02 to 1:1.6, and especially 1:1.1 to 1:1.5. The preferred method of carrying out this reaction is by heating the reactants at 100°-200° C., in the presence or absence of an inert solvent, and in the presence of a base, which may be a tertiary amine but is preferably an alkali metal hydroxide.

The dihydric phenol which is used for advancement may be mononuclear, e.g., hydroquinone, but is preferably a bisphenol, especially one of formula

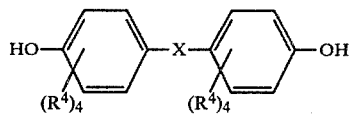

IX where X and $R^4$ are as hereinbefore defined,
such as bis(4-hydroxyphenyl)methane (i.e., bisphenol F) and 2,2-bis(4-hydroxyphenyl)propane (i.e., bisphenol A).

The preferred polyepoxides which may be advanced to form the starting material of formula VI are those containing two terminal groups of formula

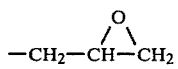

X directly attached to an atom or atoms of oxygen, nitrogen, or sulphur.

As examples of such resins may be mentioned polyglycidyl esters obtainable by reaction of a compound containing two carboxylic acid groups per molecule with epichlorohydrin or glycerol dichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, and dimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids, such as phthalic acid, isophthalic acid, and terephthalic acid.

Further examples are polyglycidyl ethers obtainable by reaction of a compound containing at least two free alcoholic hydroxyl or phenolic hydroxyl groups per molecule with epichlorohydrin or glycerol dichlorohydrin under alkaline conditions or, alternatively, in the presence of an acid catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 2,2-bis(4-hydroxyphenyl)propane, 2,2-bis(3,5-dibromo-4-hydroxyphenyl)propane (otherwise known as tetrabromobisphenol A), and 2,2-bis(2-allyl-4-hydroxyphenyl)propane.

Poly(N-glycidyl) compounds include, for example, those obtained by dehydrochlorination of the reaction products of epichlorohydrin with amines containing two amino-hydrogen atoms such as aniline, n-butylamine, and bis(4-methylaminophenyl)methane; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Polyepoxides having the 1,2-epoxide groups attached to different kinds of hetero atoms may be employed, e.g., the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Polyepoxides containing non-terminal epoxide groups may also be employed, such as vinylcyclohexene dioxide, limonene dioxide, dicyclopentadiene oxide, 4-oxatetracyclo[6,2,1,0$^{2,7}$,0$^{3,5}$]undec-9-yl glycidyl ether, the bis(4-oxatetracyclo[6,2,1,0$^{2,7}$,0$^{3,5}$]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, and 3-(3,4-epoxycyclohexyl)-8,9-epoxy-2,4-dioxaspiro[5,5]undecane.

Also, if desired, a mixture of diepoxides may be used. If desired, polyepoxides containing more than two epoxide groups may be advanced but, as those skilled in the art of epoxide resins are aware, advancement of such resins is more difficult, there being a risk of gelation.

Preferred diepoxides are diglycidyl ethers and diglycidyl esters. Specific preferred diepoxides are diglycidyl ethers of 2,2-bis(4-hydroxyphenyl)propane or bis(4-hydroxyphenyl)methane, having a 1,2-epoxide content of more than 1.0 equivalent per kilogram.

The dihydric phenol may be used alone or, if desired, in the presence of a compound which will react with one of the terminal epoxide groups of the polyepoxide but will not react further, and so prevents further chain-lengthening reaction. Suitable such 'chain-terminators' are secondary monoamines, monocarboxylic acids, and, more especially, monohydric phenols, p-tert.butylphenol being particularly preferred. If a chain terminator is added it must be in such a quantity that at least one epoxide group per average molecule of the polyepoxide is left free to react with the dihydric phenol.

As already stated, the salts of this invention may be used, in the form of heat-curable compositions, to form surface coatings.

This invention accordingly further provides heat-curable compositions comprising 100 parts by weight of a salt of formula I, calculated on its solids content (as hereinafter defined) and 2 to 200 parts, preferably 25 to 150 parts, by weight, calculated on its solids content, of an aminoplast, a phenol-formaldehyde resin, or a blocked polyisocyanate, the aminoplast or phenol-formaldehyde resin having at least 2 groups of formula

-CH$_2$OR$^{12}$          XI attached directly to an amidic nitrogen atom or atoms or directly attached to carbon atoms of a phenolic ring, where $R^{12}$ represents a hydrogen atom or an alkyl group of from 1 to 6 carbon atoms.

Such compositions in a form suitable for application will usually also contain water and a minor proportion, compared with the volume of water, of an organic solvent, such as an ether, alcohol, ketone or ester, especially 2-butoxyethanol or 2-ethoxyethanol. Methylolated compounds which may be used to form the compositions include urea-formaldehyde condensates, aminotriazine-formaldehyde condensates, especially melamine-formaldehyde and benzoguanamine-formaldehyde condensates, and phenol-formaldehyde condensates. These may be etherified if desired, e.g., the n-butyl ethers may be used. In many cases the methylolated compounds and their ethers are not themselves water-soluble or water-dispersible. The incorporation of a compound of formula I aids the dispersion or solution of such materials in water, giving stable solutions or dispersions of the mixtures.

Examples of suitable blocked polyisocyanates (i.e., those which are stable in the aqueous dispersion at room temperature but which react with the compound of formula I on heating) include di- and poly-isocyanates blocked with caprolactam, an oxime (e.g., cyclohexanone oxime), a monohydric phenol (e.g., phenol itself, p-cresol, p-tert.butylphenol), or a monohydric aliphatic, cycloaliphatic, or araliphatic alcohol (e.g., methanol, n-butanol, decanol, 1-phenylethanol, 2-ethoxyethanol, and 2-n-butoxyethanol). Suitable isocyanates include aromatic di-isocyanates such as m-phenylene, 1,4- naphthylene, 2,4- and 2,6-tolylene, and 4,4'-methylenebis(phenylene) di-isocyanates, and also their prepolymers with glycols (e.g., ethylene and propylene glycol), glycerol, trimethylolpropane, pentaerythritol, diethylene glycol, and adducts of alkylene oxides with these aliphatic di- and polyhydric alcohols.

The compositions may be cured by heating at 100° C. to 275° C., preferably 150° C. to 225° C., for from 30 seconds to 1 hour, preferably from 2 to 30 minutes.

Other water-soluble or water-dispersible film-forming substances may also be included, such as alkyd resins and acrylic resins. The amount of such materials may vary between wide limits, but should not be so great as to mask the advantageous properties of the compositions of this invention. Typically, additions of up to 50%, and preferably not more than 30% may be used, these percentages being based on the solids content of the materials.

By the term "solids content", as used throughout the present specification and the claims thereto, is meant the percentage residue left after a 1 g sample of the material has been heated in a 5 cm diameter open dish in an oven at 120° C. for 3 hours at atmospheric pressure.

We have further found that if in formula I $R^5$ denotes a group of formula —CH($R^3$)OH the salts may be heat-cured without including an aminoplast, a phenol-formaldehyde resin, or a blocked polyisocyanate.

A further aspect of this invention accordingly provides a method of coating a surface which comprises applying thereto a salt of formula I wherein $R^5$ denotes a group of formula —CH($R^3$)OH and heating the coated surface to a temperature within the range 100° C. to 275° C., preferably 150° C. to 225° C., for from 30 seconds to 1 hour and preferably for from 2 to 30 minutes.

This invention further comprises surfaces coated with a composition of this invention, both in the cured and uncured states. Such surfaces are preferably of primed or unprimed metal, especially a ferrous metal, but may also be of wood or synthetic materials.

The compositions may be applied by immersion, brushing, rollering, spraying (including electrostatic spraying), by electrodeposition, or by any other conventional means. They may, if desired, include pigments and dyes. Other materials which may be incorporated include extenders such as calcium carbonate, calcium sulphate, barium sulphate, and magnesium silicate, surface-active agents, flow additives, and plasticisers. They preferably also contain a strong acid, e.g., an aromatic sulphonic acid or its salt with an amine or ammonia, as catalyst.

This invention is illustrated by the following Examples in which all percentages are by weight.

The starting materials used in the Examples were prepared as follows:

Phenol I

Epoxide resin I, a liquid glycidyl polyether of 2,2-bis(4-hydroxyphenyl)propane (934 g; epoxide group content 5.35 equiv./kg), 2,2-bis(4-hydroxyphenyl)propane (684 g), and aqueous sodium hydroxide solution (1 g; 5%) were stirred and heated under nitrogen to 160° C. The molar ratio of epoxide resin to bisphenol was 1:1.2 An exothermic reaction commenced and the temperature of the mixture rose spontaneously to 208° C. The mixture was cooled to 180° C. and stirred at this temperature for a further 3 hours to give Phenol I, a phenolic hydroxyl group-terminated resin having negligible epoxide group content (not more than 0.02 equiv./kg) and an average molecular weight of 2370.

Phenol II

Epoxide resin I (855 g), 2,2-bis(4-hydroxyphenyl)propane (645 g), p-tert.butylphenol (90 g), and aqueous sodium hydroxide solution (1.5 g; 5%) were stirred and heated under nitrogen to 180° C. The molar ratio of epoxide resin to bisphenol to monohydric phenol was 1:1.24:0.4. An exothermic reaction commenced and the temperature of the mixture rose spontaneously to 207° C. The mixture was cooled to 180° C. and stirred at this temperature for 3½ hours to give Phenol II, a phenolic hydroxyl group-terminated resin having a negligible epoxide group content and an average molecular weight of 1320.

Phenol III

This was similar to Phenol II but had an average molecular weight of 2580 and a negligible epoxide content (0.016 equiv./kg). It was prepared from Epoxide resin I, the bisphenol, and the monohydric phenol in a molar ratio of 1:1.5:0.04.

Phenol IV

This was similar to Phenol II but was prepared from the epoxide resin, the bisphenol, and the monohydric phenol in a molar ratio of 1:1.22:0.08. It had an average molecular weight of 1780 and a negligible epoxide content.

Phenol V

This was similar to Phenol I but was prepared from the epoxide resin and the bisphenol in a molar ratio of 1:1.25. It had an average molecular weight of 2020 and a negligible epoxide content.

Phenol VI

This was similar to Phenol I but was prepared from the epoxide resin and the bisphenol in a molar ratio of 1:1.18. It had an average molecular weight of 2520 and a negligible epoxide content.

Phenol VII

This was similar to Phenol II but was prepared from the epoxide resin, the bisphenol and the monohydric phenol in a molar ratio of 1:1.14:0.14. Its average molecular weight was 1880 and its epoxide content was negligible.

Phenol VIII 3,4-Epoxycyclohexylmethyl 3',4'-epoxycyclohexanecarboxylate (200 g; epoxide group content 7.00 equiv./kg), 2,2-bis(4-hydroxyphenyl)propane (199.5 g), and aqueous tetramethylammonium chloride (2.4 g; 50%) were stirred and heated to 120° C. The molar ratio of the epoxide resin to bisphenol was 1:1.25. An exothermic reaction commenced and the temperature of the mixture rose spontaneously to 132° C. The mixture was cooled to 120° C. and stirred at this temperature for a further 2 hours followed by 3 hours at 160° C. to give Phenol VIII, a phenolic hydroxyl group-terminated resin having a negligible epoxide group content (0.08 equiv./kg) and an average molecular weight of 1220.

Phenol IX 1,3-Diglycidyl-5,5-dimethylhydantoin (97.5 g.; epoxide group content 7.70 equiv./kg), 2,2-bis(4-hydroxyphenyl)propane (114 g), and aqueous tetramethylammonium chloride (1.3 g; 50%) were stirred and heated to 130° C. The molar ratio of the epoxide resin to bisphenol was 1:1.33. An exothermic reaction commenced and the temperature of the mixture rose spontaneously to 202° C. The mixture was cooled to 160° C. and stirred at this temperature for a further 2 hours to give Phenol IX, a phenolic hydroxyl group-terminated resin having a negligible epoxide group content (not more than 0.02 equiv./kg).

Phenol X

Epoxide resin I (114.3 g), hydroquinone (44 g), and aqueous tetramethylammonium chloride (1 g; 50%) were stirred and heated to 130° C. The molar ratio of Epoxide resin I to hydroquinone was 1:1.33. An exothermic reaction commenced and the temperature of the mixture rose spontaneously to 190° C. The mixture was cooled to 160° C. and stirred at this temperature for 3½ hours to give Phenol X, a phenolic hydroxyl group-terminated resin having a negligible epoxide group content (not more than 0.02 equiv./kg).

Phenol XI

Epoxide resin I (114.3 g), 2,2-bis(4-hydroxyphenyl)methane (80.0 g) and aqueous tetramethylammonium chloride (1.2 g; 50%) were stirred and heated to 130° C. The molar ratio of Epoxide resin I to the bisphenol was 1:1.33. An exothermic reaction commenced and the temperature of the mixture rose spontaneously to 185° C. The mixture was cooled to 160° C. and stirred at this temperature for 3 hours to give Phenol XI, a phenolic hydroxyl group-terminated resin having a negligible epoxide group content.

Phenol XII

Epoxide resin I (152.4 g), 2,2-bis(3-allyl-4-hydroxyphenyl)propane (184.8 g), and aqueous tetramethylammonium chloride (2 g; 50%) were stirred and heated to 120° C. The molar ratio of Epoxide resin I to bisphenol was 1:1.5. An exothermic reaction commenced and the temperature of the mixture rose spontaneously to 165° C. The mixture was cooled to 160° C. and stirred at this temperature for 3 hours to give Phenol XII, a phenolic hydroxyl group-terminated resin having a negligible epoxide group content.

Aminoplast I

This is a fully methylated urea-formaldehyde resin of substantially 100% solids content.

Aminoplast II

This is a methylated hexamethylolmelamine resin of 100% solids content which contains, on average, 4.0 methoxymethyl residues per aminotriazine nucleus, and has a viscosity of 10 Pa s at 25° C.

Aminoplast III

This is a commercially available butylated urea-formaldehyde resin, of solids content 53%.

Aminoplast IV

This is a commercially available butylated benzoguanamine-formaldehyde resin, of solids content 70%.

Phenoplast I

This is a resol prepared from formaldehyde and 2,2-bis(4-hydroxyphenyl)propane in a molar ratio of bisphenol:formaldehyde of 1:2.5. It is not soluble nor dispersible in water. Its solids content is 80%.

Phenoplast II

This is a commercially available butylated phenol-formaldehyde resin, supplied as a solution (56% solids content) in n-butanol containing a small amount of toluene. It is not soluble nor dispersible in water.

Free formaldehyde was determined by the following method:

About 1.5 g of the resin was weighed accurately and placed in a conical flask. Distilled water (30 ml) was added and the contents were mixed thoroughly. Thymolphthalein indicator (3 drops) was added and the mixture was adjusted to neutrality with N/10 hydrochloric acid or sodium hydroxide, if necessary. The mixture was cooled in ice, and ice-cold sodium sulphite solution (25 ml, 12.5% w/w) was added. The mixture was shaken vigorously and then titrated against N/10 hydrochloric acid until the blue colour disappeared. The percentage free $$\text{formaldehyde} = \frac{\text{titre (ml)} \times \text{normality of HCl} \times 3.001}{\text{sample weight (g)}}$$

EXAMPLE 1

A solution of Phenol I (50.7 g; 0.021 mole) in 2-butoxyethanol (19.7 g) was treated with sarcosine (4.6 g; 0.052 mole) and 2-(dimethylamino)ethanol (4 g; 0.045 mole) and was heated to 80° C. This solution was mixed with a solution of paraformaldehyde (1.7 g; 91% active content, 0.052 mole) in 2-butoxyethanol (10 g) and 2-(dimethylamino)ethanol (0.5 g; 0.005 mole) and the mixture was maintained at 80° C. for 1 hour.

The product is substantially of formula I, where $R^1$ denotes —$CH_2$—, $R^2$ denotes —$CH_3$, $R^3$, $R^4$, and $R^6$ denote —H, about 25% of the groups $R^5$ denote a group of formula II and the remainder denotes hydrogen atoms, $R^7$ denotes a residue comprising units of formula

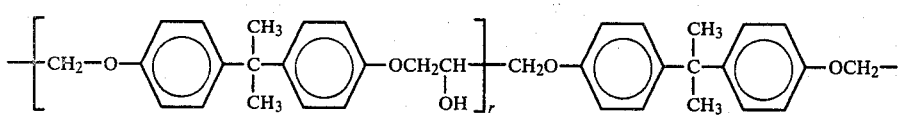

XII wherein r has an average value of 5.5, m is 2, p is zero, n is 1, X denotes isopropylidene, and substantially 100% of $M^+$ denote a group of formula $HOCH_2CH_2N^+H(CH_3)_2$.

Distilled water (170 g) was added to give a solution having a solids content of 25.7% and a viscosity at 25° C. of 5.6 Pa s. This solution was fully dilutable with water.

EXAMPLE 2

A solution of Phenol I (45.6 g; 0.019 mole) in 2-butoxyethanol (18.4 g) was mixed with 2-(dimethylamino)ethanol (3.6 g; 0.04 mole). The mixture was stirred and heated to 80° C. and then a solution of 91% paraformaldehyde (1.5 g; 0.046 mole) in 2-butoxyethanol (10 g) and 2-(dimethylamino)ethanol (0.5 g; 0.005 mole) was added. The mixture was stirred at 80° C. for 30 minutes. At the end of this period the measured free formaldehyde level of the reaction mixture was zero. To the reaction mixture was added sarcosine (4.1 g; 0.046 mole) and 2-(dimethylamino)ethanol (0.5 g; 0.005 mole). After a further 1½ hours at 80° C., 96 g of water was added. The resultant solution had a solids content of 33.2%, a viscosity at 25° C. of 39.9 Pa s, and was fully dilutable with water.

The product has substantially the same composition as that of Example 1.

EXAMPLE 3

A solution of Phenol II (201 g; 0.152 mole) in 2-butoxyethanol (67 g) was mixed with glycine (20 g; 0.27 mole) and 2-(dimethylamino)-ethanol (22 g; 0.25 mole). The mixture was stirred, heated to 80° C., and a solution was added of 91% paraformaldehyde (17.6 g; 0.53 mole) in 2-butoxyethanol (30 g) and 2-(dimethylamino)ethanol (3 g; 0.033 mole). The temperature of the mixture rose to 85° C. and was then held at 80° C. for 25 minutes. At the end of this period the measured free formaldehyde level of the reaction mixture was zero.

The product is substantially of formula I, where $R^1$ denotes $-CH_2-$, $R^3$, $R^4$, and $R^6$ denote $-H$, $R^2$ and $R^5$ denote either a hydrogen atom or a group of formula $-CH_2OH$, $R^7$ denotes a residue comprising units of formula XII wherein r is of average value 2.3, (m+p)=2, n=1, $R^9$ denotes p-tert.butylphenoxy, X denotes isopropylidene, and 100% of $M^+$ denote a group of formula $HOCH_2CH_2NH^+(CH_3)_2$.

Distilled water (250 g) was added to give a solution having a solids content of 31.2% and a viscosity at 25° C. of 50 of 50 Pa s. This solution was fully dilutable with water.

EXAMPLE 4

A solution of Phenol III (52.8 g; 0.020 mole) in 2-butoxyethanol (35.2 g) was mixed with sarcosine (2.8 g; 0.031 mole) and 2-(dimethylamino)ethanol (1.7 g; 0.019 mole). The mixture was stirred and heated to 80° C., then a solution of 91% paraformaldehyde (1 g; 0.030 mole) in 2-butoxyethanol (15 g) and 2-(dimethylamino)ethanol (1.2 g; 0.013 mole) was added. The mixture was stirred at 80° C. for 3 hours, and distilled water (90 g) was added. The resultant solution had a solids content of 26.3%, a viscosity at 25° C. of 2.2 Pa s, and was fully dilutable with water.

The product contains on average about 75% of a salt of formula I, where $R^1$ denotes $-CH_2-$, $R^2=-CH_3$, $R^3$, $R^4$, $R^5$, and $R^6$ each denote $-H$, $R^7$ denotes a residue comprising units of formula XII wherein r is of average value 6.2, (m+p)=2, n=1, $R^9$ denotes p-tert.butylphenoxy, X denotes isopropylidene and 100% of $M^+$ denote a group of formula $HOCH_2CH_2N^+H(CH_3)_2$.

EXAMPLE 5

A solution of Phenol IV (44.5 g; 0.025 mole) in 2-butoxyethanol (29.7 g) was mixed with glycine (1.9 g; 0.025 mole) and 2-(dimethylamino)ethanol (1.3 g; 0.015 mole). The mixture was stirred, heated to 80° C., and a solution was added of 91% paraformaldehyde (1.8 g; 0.055 mole) in 2-butoxyethanol (10 g) and 2-(dimethylamino)ethanol (2 g; 0.022 mole). The mixture was kept at 80° C. for 2 hours, then at 100° C. for 30 minutes.

The product contains on average about 50% of a salt of formula I, where $R^1$ denotes $-CH_2-$, $R^3$, $R^4$, and $R^6$ denote $-H$, $R^2$ and $R^5$ each denote a hydrogen atom or a group of formula $-CH_2OH$, $R^7$ denotes a residue comprising units of formula XII wherein r is of average value 3.7, (m+p)=2, n=1, $R^9$=p-tert.butylphenoxy, X denotes isopropylidene, and 100% of $M^+$ denote a group of formula $HOCH_2CH_2N^+(CH_3)_2$.

Distilled water (100 g) was added to give a solution having a solids content of 22.7% and a viscosity at 25° C. of 0.41 Pa s. It was fully dilutable with water.

EXAMPLE 6

A solution of Phenol I (101.3 g; 0.043 mole) in 2-butoxyethanol (39.4 g) was mixed with sarcosine (8.9 g; 0.1 mole) and 2-(dimethylamino)ethanol (8.8 g; 0.099 mole) and heated to 80° C. This solution was mixed with a solution of 91% paraformaldehyde (3.6 g; 0.11 mole) in 2-butoxyethanol (10 g) and 2-(dimethylamino)ethanol (1.0 g; 0.01 mole) and the mixture was maintained at 80° C. for 1 hour. A solution of 91% paraformaldehyde (1.3 g; 0.4 mole) in 2-butoxyethanol (5 g) and 2-(dimethylamino)ethanol (0.5 g; 0.006 mole) was then added and the mixture was heated at 80° C. for a further 2 hours.

The product is substantially of formula I, where $R^1$ denotes $-CH_2-$, $R^2$ denotes $-CH_3$, $R^3$, $R^4$, and $R^6$ each denote $-H$, about 17% of $R^5$ denote a group of formula II, the remainder denoting hydrogen atoms, $R^7$ denotes a residue comprising units of formula XII wherein r is of average value 5.5, m=2, n=1, p=zero, X denotes isopropylidene, and 100% of $M^+$ denote a group of formula $HOCH_2CH_2N^+H(CH_3)_2$.

Distilled water (200 g) was added, giving a paste-like solution having a solids content of 35.9%. This solution was fully dilutable with water.

EXAMPLE 7

A solution of Phenol I (50.7 g; 0.021 mole) in 2-butoxyethanol (19.7 g) was mixed with p-aminobenzoic acid (6.9 g; 0.050 mole) and 2-(dimethylamino)ethanol (4.0 g; 0.045 mole), and then it was heated to 120° C. A solution of 91% paraformaldehyde (1.7 g; 0.052 mole) in 2-butoxyethanol (7 g) and 2-(dimethylamino)ethanol (0.5 g; 0.006 mole) was then added and the mixture was maintained at 120° C. for a further hour.

The product is substantially of formula I, where $R^1$ denotes p-phenylene, $R^2$, $R^3$, $R^4$, and $R^6$ each denote —H, 19% of $R^5$ denote a group of formula II, the remainder denoting a hydrogen atom, $R^7$ denotes a residue comprising units of formula XII wherein r is of average value 5.5, m=2, n=1, p denotes zero, X denotes isopropylidene, and 100% of $M^+$ denote a group of formula $HOCH_2CH_2N^+H(CH_3)_2$.

After cooling the mixture to 80° C., distilled water (160 g) was added, giving a paste-like solution having a solids content of 25.4%. This solution was fully dilutable with water.

EXAMPLE 8

A solution of Phenol V (100 g; 0.050 mole) in 2-butoxyethanol (38.0 g) was mixed with p-aminobenzoic acid (13.7 g; 0.1 mole) and 2-(dimethylamino)ethanol (8.5 g; 0.096 mole) and the mixture was heated to 120° C. A solution of 91% paraformaldehyde (5 g; 0.15 mole) in 2-butoxyethanol (10.0 g) and 2-(dimethylamino)ethanol (1.0 g; 0.011 mole) was added, and the mixture was maintained at 120° C. for a further 3½ hours.

The product is substantially of formula I, where $R^1$ denotes p-phenylene, $R^3$, $R^4$, and $R^6$ denote —H, $R^2$ and $R^5$ each denote a group of formula —$CH_2OH$ or a hydrogen atom, $R^7$ denotes a residue comprising units of formula XII wherein r is of average value 5.3, m=2, n=1, p denotes zero, X denotes isopropylidene, and 100% of $M^+$ denote a group of formula $HOCH_2CH_2N^+H(CH_3)_2$.

The mixture was cooled to 80° C. and distilled water (207 g) was added. The resultant solution had a solids content of 35.8% and a viscosity at 25° C. of 6.2 Pa s. This solution was fully dilutable with water.

EXAMPLE 9

A solution of Phenol VI (103.2 g; 0.041 mole) in 2-butoxyethanol (68.8 g) was mixed with p-aminobenzoic acid (8.2 g; 0.060 mole) and 2-(dimethylamino)ethanol (3.9 g; 0.044 mole) and was heated to 120° C. A solution of 91% paraformaldehyde (2 g; 0.061 mole) in 2-butoxyethanol (15 g) and 2-(dimethylamino)ethanol (1.5 g; 0.017 mole) was added and the mixture was maintained at 120° C. for a further 6 hours.

The product contains on average about 75% of a salt of formula I, where $R^1$ denotes p-phenylene, $R^2$, $R^3$, $R^4$, $R^5$, and $R^6$ each denote —H, $R^7$ denotes a residue comprising units of formula XII wherein r is of average value 5.6, m=2, n=1, p denotes zero, X denotes isopropylidene, and 100% of $M^+$ denote a group of formula $HOCH_2CH_2N^+H(CH_3)_2$.

After cooling, water (175 g) was added, giving a solution having a solids content of 28.9%, and a viscosity at 25° C. of 9.6 Pa s. This solution was fully compatible with water.

EXAMPLE 10

A solution of Phenol VI (126 g; 0.050 mole) in 2-butoxyethanol (84.0 g) was mixed with iminodiacetic acid (6.7 g; 0.050 mole) and 2-(dimethylamino)ethanol (6.9 g; 0.078 mole) and was heated to 80° C. A solution was added of 91% paraformaldehyde (1.8 g; 0.055 mole) in 2-butoxyethanol (10 g) and 2-(dimethylamino)ethanol (2 g; 0.022 mole). After the mixture had been maintained at 80° C. for 1½ hours, distilled water (215 g) was added to give a solution having a solids content of 27.6% and a viscosity at 25° C. of 39.9 Pa s.

The product contains about 50% of the salt of formula I, where $R^1$ denotes —$CH_2$—, $R^2$ denotes —$CH_2COO^-M^+$, $R^3$, $R^4$, $R^5$, and $R^6$ each denote —H, $R^7$ denotes a residue comprising units of formula XII wherein r is of average value 5.6, m=2, n=1, p denotes zero, X denotes isopropylidene, and 100% of $M^+$ denote a group of formula $HOCH_2CH_2N^+H(CH_3)_2$.

This solution was fully compatible with water.

EXAMPLE 11

A solution of Phenol I (50.7 g; 0.021 mole) in 2-butoxyethanol (19.7 g) was mixed with iminodiacetic acid (5.0 g; 0.038 mole) and 2-(dimethylamino)ethanol (6.0 g; 0.067 mole) was heated to 120° C. A solution of 91% paraformaldehyde (1.8 g; 0.055 mole) in 2-butoxyethanol (5 g) and 2-(dimethylamino)ethanol (1 g; 0.011 mole) was added, and the mixture was stirred at 120° C. for a further 15 minutes. The mixture was cooled and distilled water (100 g) was added.

The product is substantially of formula I, where $R^1$ denotes —$CH_2$—, $R^2$ denotes —$CH_2COO^-M^+$, $R^3$, $R^4$, and $R^6$ each denote —H, half the symbols $R^5$ denote —$CH_2OH$ and the remainder a hydrogen atom, $R^7$ denotes a residue comprising units of formula XII wherein r is of average value 5.5, m=2, n=1, p denotes zero, X denotes isopropylidene, and 100% of $M^+$ denote a group of formula $HOCH_2CH_2N^+(CH_3)_2$.

The resultant solution had a solids content of 34.2% and a viscosity at 25° C. of 140 mPa s. It was fully dilutable with water.

EXAMPLE 12

A solution of Phenol II (52.1 g; 0.040 mole) in 2-butoxyethanol (13.1 g) was mixed with anthranilic acid (18.3 g; 0.13 mole) and 2-(dimethylamino)ethanol (11.0 g; 0.124 mole). The mixture was heated to 80° C. then mixed with a solution of 91% paraformaldehyde (8.8 g; 0.27 mole), in 2-(dimethylamino)ethanol (2.0 g; 0.022 mole) and 2-butoxyethanol (15 g). After the mixture had been maintained at 80° C. for 30 minutes, distilled water (139 g) was added, giving a solution having a solids content of 32.9%.

The product is substantially of formula I, where $R^1$ denotes o-phenylene, $R^2$, $R^3$, $R^4$, and $R^6$ each denote —H, about 63% of $R^5$ denote a group of formula II and the remainder denote —$CH_2OH$, $R^7$ denotes a residue comprising units of formula XII wherein r is of average value 2.3, (m+p)=2, n=1, X denotes isopropylidene, $R^9$ denotes p-tert.butylphenoxy, and 100% of $M^+$ denote a group of formula $HOCH_2CH_2N^+H(CH_3)_2$.

This solution was fully dilutable with water.

EXAMPLE 13

A solution of Phenol II (50 g; 0.038 mole) in 2-butoxyethanol (17 g) was mixed with sarcosine (5.9 g; 0.066 mole), 2-(dimethylamino)ethanol (6 g; 0.067 mole), 91% paraformaldehyde (4.4 g; 0.133 mole) and further 2-butoxyethanol (10 g). The mixture was stirred at 100° C. for 30 minutes and distilled water (100 g) was added. The resultant solution had a solids content of 32% and a viscosity at 25° C. of 39.2 Pa s and was fully dilutable with water.

The product is substantially of formula I, where $R^1$ denotes —$CH_2$—, $R^2$ denotes —$CH_3$, $R^3$, $R^4$, and $R^6$ each denote —H, $R^5$ denotes a group of formula —$CH_2OH$, $R^7$ denotes a residue comprising units of formula XII wherein r is of average value 2.3, (m+p)=2, n=1, X denotes isopropylidene, $R^9$ denotes p-tert.butylphenoxy, and 100% of $M^+$ denote a group of formula $HOCH_2CH_2N^+H(CH_3)_2$.

EXAMPLE 14

A solution of Phenol II (50 g; 0.038 mole) in 2-butoxyethanol (17 g) was mixed with glutamic acid (3.7 g; 0.025 mole) and 2-(dimethylamino)ethanol (4.2 g; 0.047 mole). The mixture was stirred and heated to 80° C. and then a solution of 91% paraformaldehyde (1.7 g; 0.051 mole) in 2-ethoxyethanol (10 g) and 2-(dimethylamino)ethanol (0.5 g; 0.006 mole) was added and the mixture was maintained at 80° C. for 30 minutes. Distilled water was added to give a solution having a solids content of 35.6%. This solution was fully dilutable with water.

The product contains on average about 58% of a salt of formula I, where $R^1$ denotes

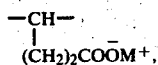

$R^3$, $R^4$, and $R^6$ denote —H, $R^2$ and $R^5$ each denote a hydrogen atom or a group of formula —$CH_2OH$, $R^7$ denotes a residue comprising units of formula XII wherein r is of average value 2.3, (m+p)=2, n=1, X denotes isopropylidene, $R^9$ denotes p-tert.butylphenoxy, and 100% of $M^+$ denote a group of formula $HOCH_2CH_2N^+H(CH_3)_2$.

EXAMPLE 15

Phenol VII (2000 g; 1.06 mole) was mixed with 2-butoxyethanol (1354 g) and heated to 120° C. When the phenol had completely dissolved, aspartic acid (133.1 g; 1 mole) and an 80% aqueous solution of 2-dimethylamino-2-methylpropan-1-ol (138.1 g; 0.944 mole) were added. After the mixture had been maintained at 120° C. for a further 30 minutes, it was cooled to 80° C. Then a solution of 91% paraformaldehyde (99.1 g; 3 moles) in 2-butoxyethanol (238.1 g) and an 80% aqueous solution of 2-dimethylamino-2-methylpropan-1-ol (9.9 g; 0.068 mole) was added. This mixture was stirred at 80° C. for 3 hours, by which time the measured free formaldehyde of the mixture was zero. The product had a solids content of 56%, a viscosity at 25° C. of 81.0 Pa s, and was fully dilutable with water.

The product contains on average about 50% of a salt of formula I, where $R^1$ denotes

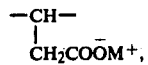

$R^3$, $R^4$, and $R^6$ denote —H, $R^2$ and $R^5$ each denote a hydrogen atom or a group of formula —$CH_2OH$, $R^7$ denotes a residue comprising units of formula XII wherein r is of average value 4.0, (m+p)=2, n=1, $R^9$ denotes p-tert.butylphenoxy, X denotes isopropylidene, 50% of $M^+$ denote a group of formula $HOCH_2C(CH_3)_2N^+H(CH_3)_2$ and the remainder denote $H^+$.

EXAMPLE 16

The procedure of Example 15 was repeated, with a smaller proportion of aspartic acid. Thus, Phenol VII (300 g; 0.160 mole), was mixed with 2-butoxyethanol (207.8 g), aspartic acid (10 g; 0.075 mole), and 10.4 g (0.07 mole) of the 80% aqueous solution of 2-dimethylamino-2-methylpropan-1-ol were added. Then a solution of 91% paraformaldehyde (7.5 g; 0.23 mole) in 2-butoxyethanol (29.3 g) and an 80% aqueous solution of 2-dimethylamino-2-methylpropan-1-ol (0.75 g; 0.005 mole) was added. The resulting solution, which was fully dilutable with water, had a viscosity at 25° C. of 59.0 Pa s.

The product contains on average 23% of a salt of formula I, where $R^1$ denotes

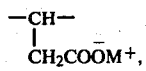

$R^3$, $R^4$, and $R^6$ denote —H, $R^2$ and $R^5$ denote a hydrogen atom or a group of formula —$CH_2OH$, $R^7$ denotes a residue comprising units of formula XII wherein r is of average value 4.0, (m+p)=2, n=1, $R^9$ denotes p-tert-.butylphenoxy, X denotes isopropylidene, and 100% of $M^+$ denote a group of formula $HOCH_2C(CH_3)_2N^+H(CH_3)_2$.

EXAMPLE 17

A solution of Phenol V (50 g; 0.025 mole) in 2-butoxyethanol (19 g) was mixed with glycine (7.5 g; 0.1 mole) and 2-(dimethylamino)ethanol (8.5 g; 0.096 mole). The mixture was stirred and heated to 80° C. and then a solution of 91% paraformaldehyde (9.9 g; 0.3 mole) in 2-ethoxyethanol (20 g) and 2-(dimethylamino)ethanol (1 g; 0.01 mole) was added and the mixture was maintained at 80° C. for 1½ hours. At the end of this period the measured free formaldehyde content of the mixture was 2.6%. 2-butoxyethanol (20 g) was added. The resulting solution had a viscosity at 25° C. of 22.4 Pa s, a solids content of 55.5%, and was fully dilutable with water.

The product is substantially of formula I, where $R^1$ denotes —$CH_2$—, $R^2$ denotes —$CH_2OH$, $R^3$, $R^4$, and $R^6$ denote —H, $R^5$ denotes

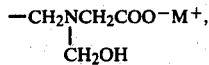

$R^7$ denotes a residue comprising units of formula XII wherein r is of average value 5.3, m=2, n=1, p denotes zero, X denotes isopropylidene, and 100% of $M^+$ denote a group of formula $HOCH_2CH_2N^+H(CH_3)_2$.

EXAMPLE 18

Phenol VIII (50 g; 0.041 mole) was mixed with 2-butoxyethanol (40 g) and heated to 120° C. When the phenol had completely dissolved, aspartic acid (6.6 g; 0.050 mole) was added and the mixture was held at 120° C. for a further 30 minutes. After cooling the mixture to 80° C., 91% paraformaldehyde (5 g; 0.15 mole) and an 80% aqueous solution of 2-dimethylamino-2-methylpropan-1-ol (14.8 g, 0.1 mole) were added. This mixture was stirred at 80° C. for 5 hours, by which time the measured free formaldehyde content had fallen to 0.15%. The product had a solids content of 53% and was fully dilutable with water.

The product contains about 50% of the salt of formula I, where $R^1$ denotes

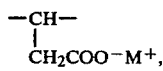

$R^3$ and $R^4$ denote —H, $R^2$ and $R^5$ each denote a hydrogen atom or a group of formula $CH_2OH$, $R^6$ represents a covalent bond with $R^7$, which together with the indicated hydroxyethylene group represents a cycloaliphatic ring system, m is 2, p is zero, n is 1, X denotes isopropylidene, and 100% of M+ denote a group of formula $HOCH_2C(CH_3)_2NH^+(CH_3)_2$.

EXAMPLE 19

Phenol IX (50 g) was mixed with 2-butoxyethanol (40 g) and heated to 120° C. When the phenol had completely dissolved, aspartic acid (6.6 g; 0.050 mole) was added and the mixture was held at 100° C. for a further 30 minutes. After cooling the mixture to 80° C., 91% paraformaldehyde (5 g; 0.15 mole) and an 80% aqueous solution of 2-dimethylamino-2-methylpropan-1-ol (14.8 g; 0.1 mole) were added. This mixture was stirred at 80° C. for 2 hours by which time the measured free formaldehyde content had fallen to 1.5%. The product had a solids content of 53% and was fully dilutable with water. It is substantially of formula I, where $R^1$ denotes

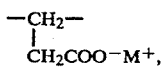

$R^2$, $R^3$, $R^4$, $R^5$, and $R^6$ each denotes —H, $R^7$ denotes a residue containing —$CH_2CH(OH)CH_2$— groups, units of formula

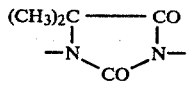

and 2,2-bis(4-oxyphenyl)propane groups, n=1, m=2, p=zero, X denotes isopropylidene, and 100% of M+ denote a group of formula $HOCH_2C(CH_3)_2N^+H(CH_3)_2$.

EXAMPLE 20

Phenol X (50 g) was mixed with 2-butoxyethanol (40 g) and heated to 120° C. When the phenol was completely dissolved, aspartic acid (6.6 g; 0.05 mole) was added and the mixture was maintained at 100° C. for a further 30 minutes. After cooling the mixture to 80° C., 91% paraformaldehyde (5 g; 0.15 mole) and an 80% aqueous solution of 2-dimethylamino-2-methylpropan-1-ol (14.8 g; 0.1 mole) was added. This mixture was stirred at 80° C. for 2 hours, by which time the free formaldehyde content had fallen to 0.9%. The product had a solids content of 53% and was fully dilutable with water. It is substantially of formula I, where $R^1$ denotes

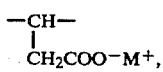

$R^2$, $R^3$, $R^4$, $R^5$, and $R^6$ each denote —H, m=2, n=p=zero, $R^7$ denotes a residue containing 2,2-bis(4-oxyphenyl)propane groups, —$CH_2CH(OH)CH_2$— groups, and p-phenylenedioxy groups, and 100% of M+ denote a group of formula $HOCH_2C(CH_3)_2NH^+(CH_3)_2$.

EXAMPLE 21

Phenox XI (50 g) was mixed with 2-butoxyethanol (40 g) and heated to 100° C. When the phenol had completely dissolved, aspartic acid (6.6 g; 0.050 mole) was added and the mixture was held at 100° C. for a further 30 minutes. After cooling the mixture to 80° C., 91% paraformaldehyde (5 g; 0.15 mole) and an 80% aqueous solution of 2-dimethylamino-2-methylpropan-1-ol (14.8 g; 0.1 mole) was added. This mixture was stirred at 80° C. for 3 hours by which time the measured free formaldehyde content was 1.5%. The product had a solids content of 53% and was fully dilutable with water. It is substantially of formula I where $R^1$ denotes

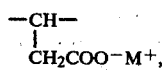

$R^2$, $R^3$, $R^4$, $R^5$, and $R^6$ each denote —H, m=2, n=1, p=zero, $R^7$ denotes a residue containing 2,2-bis(4-oxyphenyl)propane groups, —$CH_2CH(OH)CH_2$— groups and bis(4-oxyphenyl)methane groups, X denotes —$CH_2$—, and 100% of M+ denote a group of formula $HOCH_2C(CH_3)_2NH^+(CH_3)_2$.

EXAMPLE 22

Phenol XII (40 g) was mixed with 2-butoxyethanol (40 g) and heated to 100° C. When the phenol had completely dissolved, aspartic acid (5.3 g; 0.040 mole) was added and the mixture was held at 100° C. for a further 30 minutes. After cooling the mixture to 80° C., 91% paraformaldehyde (4 g; 0.12 mole) and an 80% aqueous solution of 2-dimethylamino-2-methylpropan-1-ol (14.8 g; 0.1 mole) was added. This mixture was stirred at 80° C. for 1½ hours, by which time the measured free formaldehyde content had fallen to 0.44%. The product had a solids content of 49% and was fully dilutable with water. It is substantially of formula I where $R^1$ denotes

$R^2$, $R^3$, $R^6$, and some of $R^4$ denote —H, $R^5$ and the remainder of $R^4$ denote propenyl, $R^7$ denotes a residue containing 2,2-bis(4-oxyphenyl)propane groups, —$CH_2CH(OH)CH_2$— groups and 2,2-bis(3-allyl-4-oxyphenyl)propane groups, X denotes isopropylidene, and 100% of M+ denote a group of formula $HOCH_2(CH_3)_2NH^+(CH_3)_2$.

EXAMPLE 23

A solution of Phenol VII (50 g; 0.027 mole) in 2-butoxyethanol (40 g) was mixed with aspartic acid (6.6 g; 0.050 mole) and 1,4-diazabicyclo[2,2,2]octane (5.6 g; 0.050 mole). The mixture was stirred and heated to 100° C. and maintained at this temperature for 30 minutes. After cooling to 80° C., 91% paraformaldehyde (5 g; 0.15 mole) was added. This mixture was stirred at 80° C. for 3 hours by which time the measured free formaldehyde content of the mixture had fallen to 0.98%. The product had a solids content of 62% and was dilutable with water. It is substantially of formula I, where $R^1$ denotes

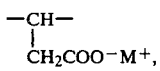

$R^2$, $R^3$, $R^4$, $R^5$, and $R^6$ each denote —H, $R^7$ denotes a residue comprising units of formula XII wherein r is of average value 4.0, (m+p)=2, n=1, $R^9$ denotes p-tert-.butylphenoxy, X denotes isopropylidene, and $M^+$ denotes a group of formula

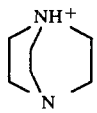

XIV

EXAMPLE 24

A formulation for coatings comprised

| | |
|---|---|
| Product of Example 3 | 22.4 g |
| Aminoplast I | 3.0 g |
| 10% aqueous solution of toluene-p-sulphonate salt of 2-(dimethylamino)ethanol | 0.4 g |
| water as required to give a viscosity at 25° C. of 20-30 mPa s. | |

The formulation was applied to tin-coated steel plates by spin-coating, leaving a coating 2 to 4 μm thick. The plates were then heated at 215° C. for 3 minutes and tested. The results are shown in Table 1.

EXAMPLE 25

A formulation for coatings comprised

| | |
|---|---|
| Product of Example 3 | 11.2 g |
| Aminoplast II | 3.0 g |
| water as required to give a viscosity at 25° C. of 20-30 mPa s. | |

The formulation was applied and cured as described in Example 24, and then tested. The results are shown in Table 1.

EXAMPLE 26

A coating formulation was prepared by warming the product of Example 8 (90 g) to 60° C. and adding a solution of Phenoplast I (10.7 g) in 2-butoxyethanol (2.7 g), followed by distilled water (20 g). The mixture was maintained at 60° C. for 30 minutes and then cooled. The resulting composition had a solids content of 30.1% and a viscosity at 25° C. of 1.7 Pa s.

A sample of this composition (33.2 g) was mixed with a 10% aqueous solution of the toluene-p-sulphonate salt of 2-(dimethylamino)ethanol (0.8 g) and diluted with water to a viscosity at 25° C. of 20-30 mPa s. The coatings were applied as described in Example 24 and cured by heating at 200° C. for 10 minutes. The coatings were then tested, the results being given in Table 1.

EXAMPLE 27

A coating formulation was prepared by mixing the product of Example 6 (337 g) with Phenoplast I (33.7 g) in 2-butoxyethanol (17.2 g). Distilled water (100 g) was added, the resultant solution had a viscosity at 25° C. of 4.8 Pa s and a solids content of 27.9%. The solution showed no signs of separation after 3 months at room temperature.

This solution (35.8 g) was treated with a 10% aqueous solution of the toluene-p-sulphonate salt of 2-(dimethylamino)ethanol (0.6 g). This was further diluted with distilled water to a viscosity at 25° C. of 20-30 mPa s, then applied as described in Example 24 and cured by heating at 200° C. for 10 minutes. The coatings were then tested, the results being shown in Table 1.

EXAMPLE 28

The product of Example 15 (50 g) was mixed with Phenoplast II (22 g), corresponding to a solids ratio of 66:34, and deionised water was added to bring the solids content to 26%. A coating was applied by means of a wire-bound draw bar (No. 3 K bar) to tin-coated steel plates and cured by heating at 200° C. for 12 minutes. The test results are given in Table 1.

TABLE 1

| Test | Example 24 | Example 25 | Example 26 | Example 27 | Example 28 |
|---|---|---|---|---|---|
| MEK rub[1] | Pass | Pass | Pass | Pass | Pass |
| Wedge bend[2] pass at | 75% | 70% | 50% | 60% | 80% |
| Pasteurisation in water 75° C./45 min.[3] | Pass | Pass | Pass | Pass | — |
| Pasteurisation in beer 82° C./30 min.[3] | Pass | Pass | — | — | — |
| Water boil 100° C./6 hours[3] 2% acetic acid | Fail | Pass | Softened | Pass | — |
| 100° C./3 hours[3] 2% acetic acid | — | — | — | Pass | — |
| 100° C./6 hours[3] 3% acetic acid | — | — | Pass | — | — |
| 100° C./6 hours[3] | — | — | — | — | Pass |
| Sterilisation 120° C./1 hour[4] | — | — | Pass | Pass | Pass |

A dash (—) indicates that the test was not carried out
[1]The MEK rub test comprised rubbing the coated surface 50 times with cotton wool soaked in ethyl methyl ketone, and examining the surface for removal or softening. 'Pass' indicates that no effect was observed.
[2]The wedge bend test comprised impact bending the specimens over a mandrel 10 cm long, having an outside diameter of 6 mm at one end, tapering to a point at the other. The specimens were then examined to determine the percentage of the length of the sample from which the coating did not flake.
[3]The pasteurisation and boiling tests comprised heating the samples in water, beer or acetic acid for the given time and temperature and examining the coated surface for any defects. 'Pass' indicated that no defects were observed.
[4]The sterilisation test comprised heating the sample in steam at 120° C. in an autoclave for 60 minutes, and then examining the surface for defects. 'Pass' indicates that no defects were observed.

EXAMPLES 29-34

Coating formulations were prepared by mixing the products of, respectively, Examples 4, 5, and 9 to 12 with Phenoplast I in a solids ratio of 75:25. The resulting solutions were diluted with water and a 10% aqueous solution of the toluene-p-sulphonate salt of 2-(dimethylamino)ethanol (0.4 g of the 10% aqueous solution per 10 g of resin solids content). The solutions were applied to aluminium plates and cured as described in Example 24. The coatings were then tested, the results being shown in Table 2.

TABLE 2

| | Example No. | | | | | |
|---|---|---|---|---|---|---|
| Test | 29 | 30 | 31 | 32 | 33 | 34 |
| MEK rub | Pass | Pass | Pass | Pass | Pass | Pass |
| Wedge bend pass at | 80-85% | 75-80% | 70% | 80-85% | 85% | — |

TABLE 2-continued

| Test | Example No. | | | | | |
|---|---|---|---|---|---|---|
| | 29 | 30 | 31 | 32 | 33 | 34 |
| 2% acetic acid 100° C./6 hours | Pass | Pass | Pass | Pass | Pass | Pass |

EXAMPLE 35

In this Example a carboxylate salt of this invention is cured by heating with a salt of a strong acid with an amine but in the absence of an aminoplast or phenoplast.

A formulation for coatings comprised

| | |
|---|---|
| Product of Example 3 | 5 g |
| 10% aqueous solution of toluene-p-sulphonate salt of 2-(dimethylamino)ethanol | 0.2 g |
| water as required to give a viscosity at 25° C. of 20-30 mPa s. | |

The formulation was applied to tin-coated steel plates by spin-coating, leaving a coating 2 to 4 μm thick. The coating was cured at 200° C. for 5 minutes. The coating passed the MEK rub test and pasteurisation in water test described above.

EXAMPLE 36

In this Example a carboxylate salt of this invention, together with an aminoplast, is deposited on a metal surface by means of electrodeposition.

A coating formulation was prepared by mixing the product of Example 15 with Aminoplast II in a solids ratio of 80:20. The resultant mixture was diluted with deionised water to a solids content of 10%, placed in an electrocoating bath, and used to coat steel and tin-plate coated steel at the anode. Pore-free films were obtained after passing a current of 50 volts for 10 seconds.

EXAMPLE 37-40

Coating formulations were prepared by mixing the product of Example 15 with the aminoplasts listed in Table 3 in a solids ratio of 80:20 and then diluted with deionised water so that a solids content of 26% was obtained. The coatings were applied by means of a wire-bound draw bar (No. 3 K bar) to tin-coated steel plates and cured at 215° C. for 6 minutes. The adhesion obtained after various immersion tests is shown in Table 3.

TABLE 3

| | Example 37 | Example 38 | Example 39 | Example 40 |
|---|---|---|---|---|
| Aminoplast | Aminoplast I | Aminoplast II | Aminoplast III | Aminoplast IV |
| Water boil 100° C./1 hour | 0 | 0 | 0 | 0 |
| 3% acetic acid 100° C./20 minutes | 5 | 100 | 0 | 0 |

The coated panel to be tested was cross-hatched by cutting with a knife edge parallel lines 3 mm apart in one direction then others intersecting these at 90°. A strip of adhesive tape was then firmly pressed across the scribed area. The tap was pulled off with a quick continuous pull, and the cross-hatched area was examined for removal of coating. The percentage removal is recorded in the Table as follows: 0=no loss of adhesion, 100=total removal of coating.

What is claimed is:

1. Carboxylate salts of the general formula

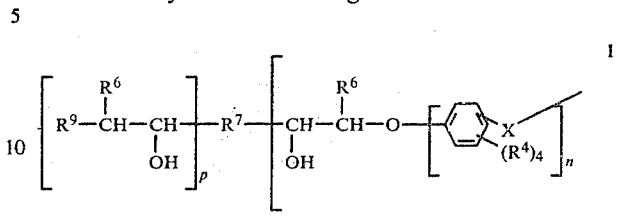

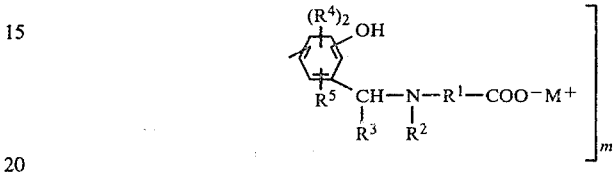

where

R$^1$ represents an aliphatic, aromatic, or araliphatic divalent group of 1 to 10 carbon atoms or a said divalent group substituted by a further —COO$^-$M$^+$, R$^2$ represents a hydrogen atom, a group of formula

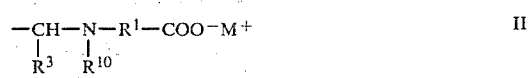

an alkyl group of from 1 to 6 carbon atoms, a said alkyl group substituted by a further group —COO$^-$M$^+$, a said alkyl group substituted by a group of formula —CH(R$^3$)OH, or a said alkyl group substituted by a group of formula —CH(R$^3$)OR$^8$, with the proviso that R$^1$ and R$^2$ contain together not more than one group of formula —COO$^-$M$^+$, R$^3$ represents a hydrogen atom or an alkyl group of 1 to 4 carbon atoms, each R$^4$, which may be the same or different, represents a hydrogen atom, a halogen atom, an alkyl group of 1 to 4 carbon atoms, or an alkenyl group of 2 to 4 carbon atoms, R$^5$ represents an atom or a group bonded to a ring carbon atom which is ortho or para to the indicated phenolic hydroxyl group and is a hydrogen atom, a halogen atom, an alkyl group of 1 to 4 carbon atoms, an alkenyl group of 2 to 4 carbon atoms, a group of formula —CH(R$^3$)OH, a group of formula —CH(R$^3$)OR$^8$, or a group of formula II, R$^6$ either represents a hydrogen atom, in which case R$^7$ represents the residue of a polyepoxide after removal of (m+p) 1,2-epoxide groups, or it represents a covalent bond linked to the group R$^7$, in which case R$^7$, together with the indicated hydroxyethylene group, forms a cycloaliphatic ring, R$^8$ represents an alkyl group of from 1 to 6 carbon atoms or an alkoxyalkyl group wherein the alkoxy group and the alkyl group each have from 1 to 6 carbon atoms, R$^9$ represents the residue of a monohydric phenol, a secondary monoamine, or a monocarboxylic acid after removal of the hydrogen atom of the phenolic hydroxyl group, the carboxylic acid group, or the secondary amino group, m represents 1, 2, 3, or 4,
n represents zero or 1,
p represents zero or 1; such that (m+p) is at least 2 and at most 4,
X represents an alkylene or alkylidene group of 1 to 3 carbon atoms, a carbonyl or sulfonyl group, an oxygen or sulfur atom, or a valence bond,
M+ represents a hydrogen ion or a monovalent cation derived from an alkali metal, ammonia, or an amine, including quaternary ammonium cations, with the proviso that at least 25% of the ions M+ are a said monovalent cation,
the indicated phenolic hydroxyl group being ortho or para to the indicated group

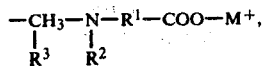

wherein $R^{10}$ denotes a hydrogen atom, a group $-COO^-M^+$, an alkyl group of 1 to 6 carbon atoms, a said alkyl group substituted by a further group $-COO-M^+$, a said alkyl group substituted by a group of formula $-CH(R^3)OH$, or a said alkyl group substituted by a group of formula $-CH(R^3)OR^8$.

2. A salt as claimed in claim 1, wherein $R^7$ represents a said residue, having an average molecular weight of from 1000 to 5000, of a polyepoxide.

3. A salt as claimed in claim 1, which is further of the formula

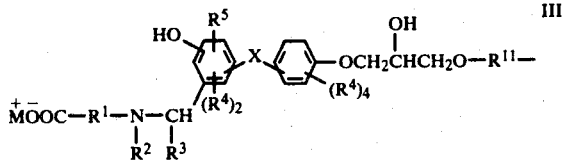

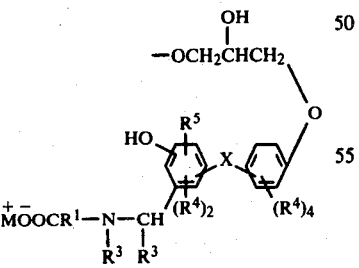

or

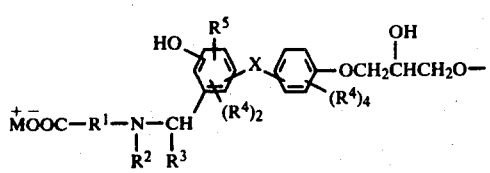

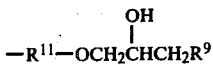

where
$R^1$, $R^2$, $R^3$, $R^4$, $R^5$, $R^9$, X, and M+ are as defined in claim 1 and
$R^{11}$ represents the residue of an aliphatic, cycloaliphatic, or aromatic diglycidyl ether or ester after removal of both glycidyl groups.

4. A salt as claimed in claim 1, wherein $R^1$ represents either an alkylene group of 1 to 4 carbon atoms or a phenylene group.

5. A salt as claimed in claim 3, wherein $R^{11}$ represents a residue of the formula

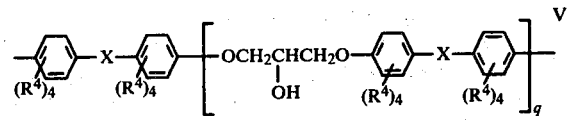

where
$R^4$ and X are as defined in claim 1 and
q is zero or an integer of from 1 to 20.

6. A salt according to claim 1, wherein $R^3$ and $R^4$ each represent a hydrogen atom.

7. A process for the preparation of a water-soluble or water-dispersible salt which comprises a Mannich reaction of a phenol-terminated resin of formula

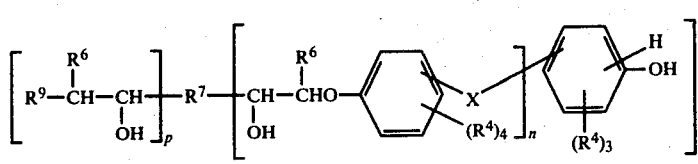

with the proviso that at least one of the two carbon atoms ortho, or the one carbon atom para, to the carbon atom bearing the indicated phenolic hydroxyl group is unsubstituted,
in the presence of a source of M+ ions with an aldehyde of formula $R^3CHO$  VII and an aminoacid of formula

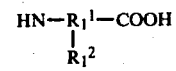  VIII where
$R^1_1$ represents an aliphatic, aromatic, or araliphatic divalent group of 1 to 10 carbon atoms which may contain a carboxylic acid (—COOH) substituent, and
$R^2_1$ represents a hydrogen atom, a group of formula

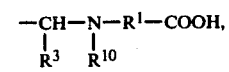

or an alkyl group of from 1 to 6 carbon atoms which alkyl group may be substituted by a carboxylic acid (—COOH) group or by a group of formula —CH(R$^3$)OH or —CH(R$^3$)OR$^8$, wherein R$^1$ represents an aliphatic, aromatic, or araliphatic divalent group of 1 to 10 carbon atoms, which may contain a carboxylic acid substituent, with the proviso that only one of R$^1{}_1$ and R$^2{}_1$ may contain the said carboxylic acid substituent, R$^3$ represents a hydrogen atom or an alkyl group of 1 to 4 carbon atoms, each R$^4$, which may be the same or different, represents a hydrogen atom, a halogen atom, an alkyl group of 1 to 4 carbon atoms, or an alkenyl group of 2 to 4 carbon atoms, R$^6$ either represents a hydrogen atom, in which case R$^7$ represents the residue of a polyepoxide after removal of (m+p) 1,2-epoxide groups, or it represents a covalent bond linked to the group R$^7$, in which case R$^7$, together with the indicated hydroxyethylene group, forms a cycloaliphatic ring, R$^8$ represents an alkyl group of from 1 to 6 carbon atoms or an alkoxyalkyl group wherein the alkoxy group and the allyl group each have from 1 to 6 carbon atoms, R$^9$ represents the residue of a monohydric phenol, a secondary monoamine, or a monocarboxylic acid after removal of the hydrogen atom of the phenolic hydroxyl group, the carboxylic acid group, or the secondary amino group, R$^{10}$ denotes a hydrogen atom, a group —COOH, an alkyl group of 1 to 6 carbon atoms, a said alkyl group substituted by a further group —COOH, or a said alkyl group substituted by a group of formula —CH(R$^3$)OH or —CH(R$^3$)OR$^8$, m represents 1, 2, 3, or 4, n represents zero or 1, p represents zero or 1, such that (m+p) is at most 4, X represents an alkylene or alkylidene group of 1 to 3 carbon atoms, a carbonyl or sulfonyl group, an oxygen or sulfur atom, or a valence bond, and M$^+$ represents a hydrogen ion or a monovalent cation derived from an alkali metal, ammonia, or an amine, including quaternary ammonium cations, with the proviso that at least 25% of the ions M$^+$ are a said monovalent cation.

8. The process of claim 7, wherein the aldehyde is formaldehyde.

9. The process of claim 7, wherein the aminoacid is sarcosine, iminodiacetic acid, anthranilic acid, glycine, glutamic acid, aspartic acid, or p-aminobenzoic acid.

10. The process of claim 7, in which the reactants are heated in the presence of sufficient of a base to neutralise at least 25% of the aminoacid, the base being sodium hydroxide, sodium carbonate, potassium hydroxide, potassium carbonate, ammonia, triethylamine, triethanolamine, 2-(dimethylamino)-2-methylpropan-1-ol, or 2-(diethylamino)ethanol.

11. The process of claim 7, in which the reactants are heated within the range 60° to 180° C.

12. The process of claim 7, wherein 0.3 to 2.0 moles of the aminoacid of formula VIII are used per mole of phenolic hydroxyl groups in the phenol-terminated resin of formula VI.

13. The process of claim 7, wherein 1.1 to 4.0 moles of the aldehyde of formula VII are used per mole of the aminoacid of formula VIII.

* * * * *